Feb. 10, 1959     A. W. BALDWIN     2,873,396
COMPOSITE INDICATOR
Filed June 2, 1955
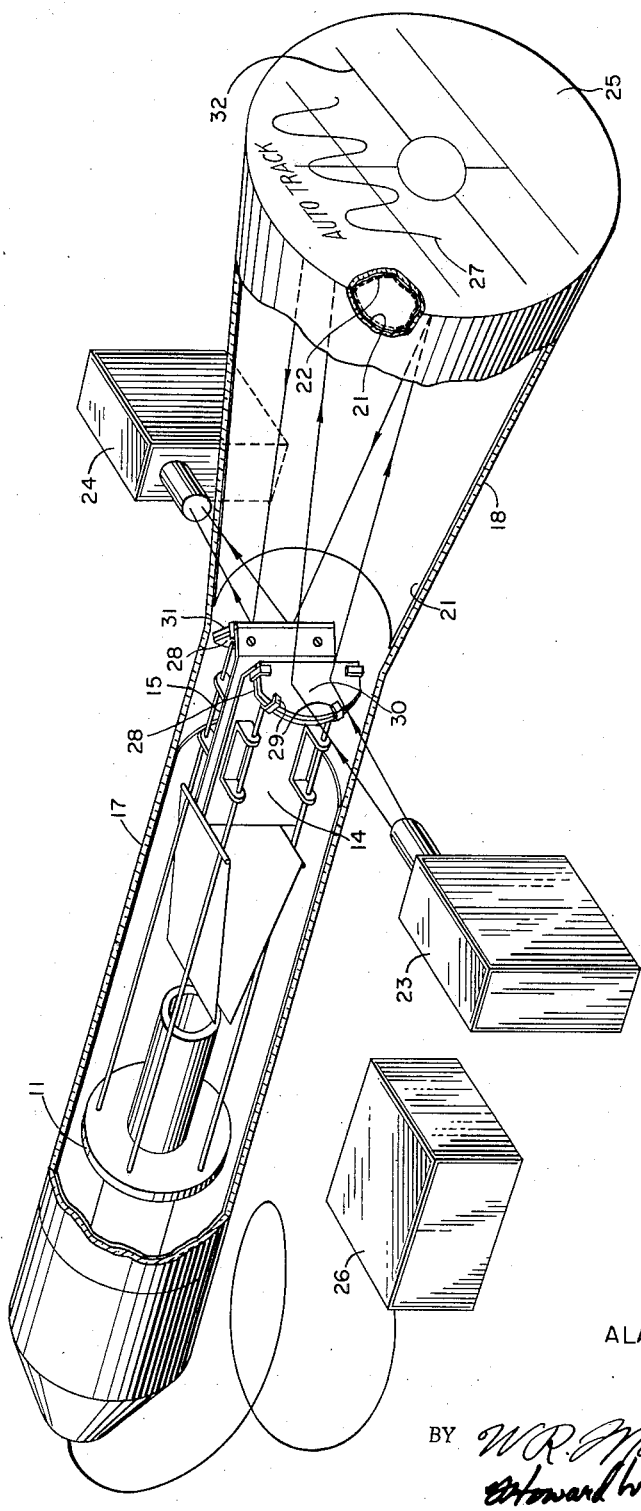
INVENTOR
ALAN W. BALDWIN
BY
ATTORNEYS

United States Patent Office

2,873,396
Patented Feb. 10, 1959

2,873,396

COMPOSITE INDICATOR

Alan W. Baldwin, Oxon Hill, Md.

Application June 2, 1955, Serial No. 512,908

2 Claims. (Cl. 313—64)

(Granted under Title 35, U. S. Code (1952), sec. 266)

The invention described herein may be manufactured and used by or for the Government of the United States of America for governmental purposes without the payment of any royalties thereon or therefor.

The present invention relates to the problems of projecting an optical image interiorly onto the phosphor screen of a cathode ray indicator tube, and photography of cathode ray indications and projected images.

It is an object of the invention to employ a cathode ray tube of conventional envelope construction for high definition optical projection of screen images without degradation by envelope curvature and thickness variations.

It is a further object of the invention to project an image completely covering the operative indication area of a cathode ray indicator tube normally through a singly curved portion of its envelope.

The invention is equally applicable to photography of cathode ray indications and may be simultaneously used for projection and recording. The invention is adaptable to many problems including: the superimposition of photographs of radar maps on raw video for navigation; the projection of several reference patterns as well as various coded signals consisting of line shapes and/or color combinations on the face of the tube in addition to the electron beam spot; the display of variable range scales, grid reference lines, index markers, background displays, and azimuth error which in the past has been limited and accomplished only through complex devices; and a means to view or to photograph the optical and/or cathode ray patterns as they appear on the inside face of the tube.

The cathode ray tube of the present invention is shown in the drawing, where the transparent glass envelope comprises cylindrical neck 17, flare 18, and screen 22. The second anode comprises an internal opaque conductive (usually carbonaceous) coating 21 applied to flare 18 covering the flare. The gun structure is based at 11 and comprises the ultimate deflection plates 14 and 15, which in the position shown effect horizontal deflection of the beam.

Means for energizing the electronic structure, 26, serves to apply operating potentials, sweep voltages, and signals to the tube to effect the desired indication on phosphor 22 carried by the transparent screen portion 25 of the envelope. The indication illustrated is wave 27.

The optical image is projected through a small portion of neck 17 from the image source 23. The latter may be a film strip projector comprising a light source, an object, and lens means. Since the requisite light intensity levels are relatively low, the projector means may be positioned within the cabinet or rack housing the indicator tube.

The optical path includes mirror 30 carried by the electron gun terminally thereof and mounted on one of the second deflection plates, 14. In the embodiment shown a stainless bracket 28 is affixed to the outer end of plate 14 as by welding, and is provided with tabs 29 holding plane mirror 30. The latter is curved peripherally to fit the inner surface of the cylindrical neck 17 and is positioned at substantially 45° with the longitudinal axis of the tube.

Mirror 30 effects projection of the optical image established by the slide, film strip or other optical object in projector 23 onto the indicator surface 22 with minimum distortion and loss of definition. The image shown in the drawing comprises a legend and reference pattern 32.

A second mirror 31 is identically mounted on plate 15 and may be similarly used for projecting other visual information. In the drawing mirror 31 is used with camera 24 to record the screen pattern comprising both the electronic indication 27 and the optical image 32. The camera may comprise a lens device and a photosensitive medium such as a photographic film with shutter and advance mechanisms.

It is therefore apparent that the invention very effectively adds visual information to video data and simultaneously provides for the photographic recording of both under continual operator's view.

It should be understood, of course, that the foregoing disclosure relates to only a preferred embodiment of the invention and that it is intended to cover all changes and modifications of the examples of the invention herein chosen for the purpose of disclosure, which do not constitute departure from the spirit and scope of the invention as set forth in the appended claims.

What is claimed is:

1. In combination, a cathode ray tube having an envelope comprising a cylindrical neck portion of normal diameter and a transparent phosphor viewing screen, electron gun means within said tube operative by electron beam excitation to establish a video pattern on said phosphor screen, said gun means comprising two pair of deflection plates, first and second mirror means positioned within said tube and secured to said pair of deflection plates mounted nearest said viewing screen, said mirrors positioned in optical relation to said phosphor viewing screen and outside the electron path from said gun to said screen, said first mirror means operative to superimpose by reflection a visual image onto said phosphor viewing screen from a point outside said tube perpendicular to said neck portion and on the same side of the electron beam path, said second mirror means operative to reflect a combined video pattern and superimposed visual image through said neck portion to a point outside said tube perpendicular to said neck portion and on the same side of the electron beam path, and said first and second mirror means operative to function without obstruction to end viewing of said video pattern and the superimposed visual image reflected onto said phosphor viewing screen.

2. Apparatus as claimed in claim 1, wherein the first and second mirror means are positioned on opposite sides of the terminal end of said electron gun and facing said screen at an angle of substantially 45 degrees to the longitudinal axis of the envelope and positioned at 90 degrees with respect to each other.

References Cited in the file of this patent

UNITED STATES PATENTS

| | | |
|---|---|---|
| 2,128,631 | Eaton | Aug. 30, 1938 |
| 2,128,632 | Eaton | Aug. 30, 1938 |
| 2,227,024 | Schlesinger | Dec. 31, 1940 |
| 2,398,960 | Prosser | Apr. 23, 1946 |
| 2,457,981 | De Forest | Jan. 4, 1949 |
| 2,644,938 | Hetzel et al. | July 7, 1953 |
| 2,677,722 | Bedford | May 4, 1954 |

FOREIGN PATENTS

| | | |
|---|---|---|
| 657,047 | Great Britain | Sept. 12, 1951 |
| 921,452 | France | Jan. 13, 1947 |